US008503362B2

(12) United States Patent
Wee et al.

(10) Patent No.: US 8,503,362 B2
(45) Date of Patent: Aug. 6, 2013

(54) SPEAKER SYNCHRONIZATION TECHNIQUE FOR WIRELESS MULTICHANNEL SOUND DATA TRANSMISSION SYSTEM

(75) Inventors: Jungwook Wee, Seoul (KR); Wongi Jeon, Yongin-si (KR); Younsung Lee, Seoul (KR); Hyunsik Kim, Seongnam-si (KR)

(73) Assignee: Korea Electronics Technology Institute, Seongnam (KR)

( * ) Notice: Subject to any disclaimer, the term of this patent is extended or adjusted under 35 U.S.C. 154(b) by 415 days.

(21) Appl. No.: 12/787,541

(22) Filed: May 26, 2010

(65) Prior Publication Data

US 2011/0142243 A1 Jun. 16, 2011

(30) Foreign Application Priority Data

Dec. 10, 2009 (KR) ........................ 10-2009-0122590
Dec. 11, 2009 (KR) ........................ 10-2009-0123359

(51) Int. Cl.
*H04W 4/00* (2009.01)

(52) U.S. Cl.
USPC ........................................... 370/328; 370/503

(58) Field of Classification Search
USPC ........................................... 370/249, 328, 503
See application file for complete search history.

(56) References Cited

U.S. PATENT DOCUMENTS 6,611,537 B1 * 8/2003 Edens et al. .................. 370/503
2002/0012364 A1 * 1/2002 Kalian et al. .................. 370/516
2006/0153155 A1 7/2006 Jacobsen et al.
2007/0030986 A1 2/2007 McArthur et al.
2007/0038999 A1 * 2/2007 Millington .................... 718/100

FOREIGN PATENT DOCUMENTS

JP 2007-013707 1/2007
KR 1020030006602 A 1/2003
KR 1020050079347 A 8/2005
KR 1020080021363 A 3/2008
KR 100902158 B1 6/2009
KR 1020090124189 A 12/2009

OTHER PUBLICATIONS

Korean Intellectual Property Office, First Office Action corresponding to KR Patent Application No. 10-2009-0122590, dated Feb. 9, 2011.
Korean Intellectual Property Office, Notice of Allowance corresponding to KR Patent Application No. 10-2009-122590, dated Sep. 30, 2011.
Korean Intellectual Property Office, Notice of Allowance corresponding to KR Patent Application No. 10-2009-0123359, dated Oct. 31, 2011.

* cited by examiner

*Primary Examiner* — Sai-Ming Chan
(74) *Attorney, Agent, or Firm* — Sughrue Mion, PLLC

(57) ABSTRACT

The present invention relates to sound data transmission between a wireless sound transmitter that transmits sound data received from a multimedia source, and a wireless sound speaker that outputs sound signal by receiving the sound data, and more particularly, to a method for compensation of a play time delay between the wireless sound speakers occurring when the multichannel sound data is distributed and transmitted from the wireless sound transmitter to the multiple wireless sound speakers. The differences in the play time points occurring between the speakers in a TDMA based multichannel wireless transmission system, are pre-compensated through the delay of the sound data in the WSDT.

7 Claims, 8 Drawing Sheets

SPEAKER SYNCHRONIZATION TECHNIQUE FOR WIRELESS MULTICHANNEL SOUND DATA TRANSMISSION SYSTEM

CROSS REFERENCE TO RELATED APPLICATIONS

This application claims the benefit under 35 U.S.C. §119 (a) of Korean Patent Application No. 10-2009-0122590, filed on Dec. 10, 2009, and Korean Patent Application No. 10-2009-0123359 filed on Dec. 11, 2009, in the Korean Intellectual Property Office, the entire disclosures of which are incorporated herein by reference for all purposes.

BACKGROUND

1. Field

The following description relates to data transmission between a wireless sound transmitter and a wireless sound speaker that outputs, and more particularly, to a method for compensation of a play time delay between the wireless sound speakers that occurs when the multichannel sound data is distributed and transmitted from the wireless sound transmitter to the multiple wireless sound speakers.

2. Background

Home theaters are vastly popular in the home environment. The term 'home theater' was used before the digital versatile disks (DVD) were commonly used, but it has been generalized after DVD systems became more widely used. A DVD system provides an excellent picture quality and a realistic sound for a user.

DVD has an advantage in that it can provide an exceptionally realistic sound compared to that of a laser disk (LD), a video home system (VHS), or a video compact disk (VCD). For example, in a scene from the movie 'Saving Private Ryan,' when a bullet is flying forward from behind, the sound played by the speaker system in the theater actually moves forward from behind simulating the direction of the bullet. In the movie 'Matrix,' when a helicopter is hovering above the head of the actor, the sound played by the speaker system in the theater makes viewers feel as if the helicopter is really hovering above their heads. Such three dimensional sound effect may be realized by multichannel digital sound technology. The most commonly used multichannel digital sound nowadays is digital multi-channel sound, for example, 5.1-channel digital sound or 6-channel digital sound.

5.1-channel is comprised of five channels including left and the right front channels located in front of a user, left and the right rear channels located in rear of the user, a center channel, and a 0.1-channel subwoofer that enhances a low frequency region. The speakers for the front channels that are located in front of the viewers are called main speakers. The role of the main speakers is to cover the background music and sound effect connecting the left and the right directions in front of the listeners.—

Typically, larger speakers are used as the main speakers as compared to the other speakers because they are advantageous when playing the stereo channels, but the main speakers are not necessarily larger than the other speakers. A speaker for the center channel, called a center speaker, covers dialogue and the human voice, i.e. vocal sounds, and it delivers a certain level of music and/or sound effects to the listeners. Occasionally, the center speakers are installed above the television so that the sounds are heard as if the actor on the screen are talking to the viewers. The speakers for the rear channel are called rear speakers or surround speakers and are usually installed at the both sides of the rear area of the listeners. The rear speakers mainly cover the surround effects. In past times mono surround channels were used, but nowadays stereo surround channels are used for 5.1-channel systems.

Meanwhile, the subwoofer covers a low frequency region and has very little restriction on its position because directivity at low frequencies is lower than directivity at medium or high frequencies. Most subwoofers are able to play 20 to 30 Hz but high performance subwoofers are able to play sounds lower than 20 Hz. Such low frequency sound provides not only the sounds but also a feeling of vibration thus making a more realistic sound play.

In some embodiments, the subwoofers have amplifiers therein. Recently, active type subwoofers having built-in amplifiers are becoming more popular for obtaining powerful sounds and automatic volume control.

The above mentioned speakers, except the subwoofer, are generally not physically different than each other but have different locations depending on their roles in the system. In some embodiments, the center speaker has slightly different characteristics for proper processing of the dialogues in a movie.

There are various types of multi-channel digital sound play system, for example, 5.1-channel system, such as 4-channel system, 4.1-channel system, and the like. Recently, 6.1-channel surround home theater systems are being introduced. When installing a home theater having multi-channel digital sound play system, each speaker must be connected to the corresponding terminals for signal output.

A typical wireless distribution and transmission method for a multichannel sound transmission is a time division multiple access (TDMA) method. The TDMA based multi-channel wireless speaker system illustrated in FIG. 1 adopts a method wherein each sound data is transmitted during the time slot assigned for each speaker so as to avoid inter-channel interferences.

In TDMA, M number of multichannel sound data extracted from the sound source are packetized in an appropriate time frame for outputting via wireless sound speakers (hereinafter referred to as "WSS"), then transmitted via wireless channels to corresponding speakers during the total transmission period through the modulator further adding play time information including speaker identification, current time, play time, and the like.

Each WSS outputs sounds through the speaker after extracting sound data by demodulating the wireless signal received. In TDMA, because multichannel sound data is continuously transmitted in temporal perspective, synchronization based on current time and play time must be performed between the speakers after all the channel signals are received in order to play sounds at the same time in all WSSs. For this reason, a buffer that is able to store sound data of more than two packets is required for continuous play, and a structure for synchronization between the WSSs should be added.

For synchronization between the WSSs, current time information must be periodically transmitted from the wireless sound distributer and transmitter (hereinafter referred to as "WSDT"), and all the packets must be transmitted with play time information. In each WSS, a reference time is set by receiving current time information and based on a reference time. Sound play should be performed in accordance with play time information of each packet. Such a structure requires an additional storage space, a timer, and a play time controller because a received packet must be stored in a buffer until the play time point. This causes an increase in hardware complexity, and it has further disadvantages in that transmission efficiency is reduced because additional information for synchronization between the speakers must be added to all the packets.

SUMMARY

Play time difference has been a problem of a conventional TDMA based multichannel wireless speaker system. In one general aspect, there is provided a transmitter unit compensation method having simpler structure in comparison to the conventional receiver unit control method by pre-compensating for play time difference between the speakers at the transmitter unit.

In another aspect, there is provided a method to solve the problem of the conventional TDMA based multichannel wireless speaker system that requires an additional storage space, a timer, and a play time controller because a received packet must be stored in a buffer until the play time point causing an increase in hardware complexity, and to overcome the disadvantage of reduced transmission efficiency because an additional information for synchronization between the speakers must be added to all the packets.

To achieve above-described objectives, a data transmission method in a TDMA based multichannel wireless transmission system of the present invention comprises the steps of: storing multiple data having identical play time information in each corresponding memory by transmitting the data in accordance with the input clock signal; outputting sequentially and repeatedly the stored data one by one from the corresponding memory in accordance with the output clock signal; and transmitting a transmit packet modulated by the output data via corresponding wireless channel.

To achieve above-described objectives, a data transmission device in a TDMA based multichannel wireless transmission system of the present invention is comprised of: a bank comprised of multiple memories wherein multiple data having identical play time information are received in accordance with the input clock signal and stored in the corresponding memories and the stored data are sequentially and repeatedly outputted one by one in accordance with the output clock signal; a modem for generating transmit packets modulated by the output data; and a communication unit for transmitting the modulated transmit packets via the wireless channel.

To achieve above-described objectives, a TDMA based multichannel wireless transmission system of the present invention is comprised of: a wireless sound transmitter for receiving multiple data having identical play time information in accordance with the input clock signal, storing the data into the corresponding memories, outputting sequentially and repeatedly the stored data one at a time, and transmitting the transmit packets modulated by the output data via the corresponding transmission channel; and a plurality of wireless sound speakers for play sounds by receiving the transmit packets from the wireless sound transmitter.

To achieve above-described objectives, a data transmission method in a TDMA based multichannel wireless transmission system of the present invention comprises the steps of: conveying multiple data having identical play time information to the corresponding delay units; outputting data inputted to the delay unit with a predetermined time delay as assigned to each sound channel; generating transmit packets that are modulated by the output data, respectively; and transmitting the generated transmit packets according to the order of a predetermined sequence via the wireless channels.

To achieve above-described objectives, a data transmission device in a TDMA based multichannel wireless transmission system of the present invention is comprised of: a delay unit for outputting data inputted to the delay unit with a predetermined time delay as assigned to each sound channel; a modem for generating transmit packets modulated by the output data of the delay unit; and a communication unit for transmitting the modulated transmit packets via the wireless channels.

To achieve above-described objectives, the present invention suggests a TDMA based multichannel wireless transmission system comprising: a wireless sound transmitter receiving multiple data having identical play time point, outputting the received data with a predetermined time delay as assigned to each sound channel, and transmitting the transmit packets modulated by the output data via the wireless channels; and a plurality of wireless sound speakers for playing sounds by receiving the transmit packets from the wireless sound transmitter.

The present invention pre-compensates differences in the play time points, occurring between the speakers in a TDMA based multichannel wireless transmission system, through the delay of the sound data in the WSDT; it enables all the WSSs to play sounds at an identical sound play time point without requiring an additional structure for synchronization of the WSSs so that the structure of the WSS can be simplified and therefore the system can be realized with minimum complexity.

Besides, a pre-compensation technique and device for the synchronization between the speakers of the multichannel wireless speaker system of the present invention provides high quality sounds for listeners by enhancing transmission efficiency since it does not require additional data such as present time information and play time information.

BRIEF DESCRIPTION OF DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

TDMA based present invention suggests a transmission method wherein M number of sound data are acquired and stored simultaneously in each corresponding sound buffer, and the stored sound data is sequentially transmitted in accordance with time slots correspondingly assigned to each sound data, and the time differences occurring at this time are compensated for at the wireless sound distributer and transmitter (WSDT).

Figure 1:
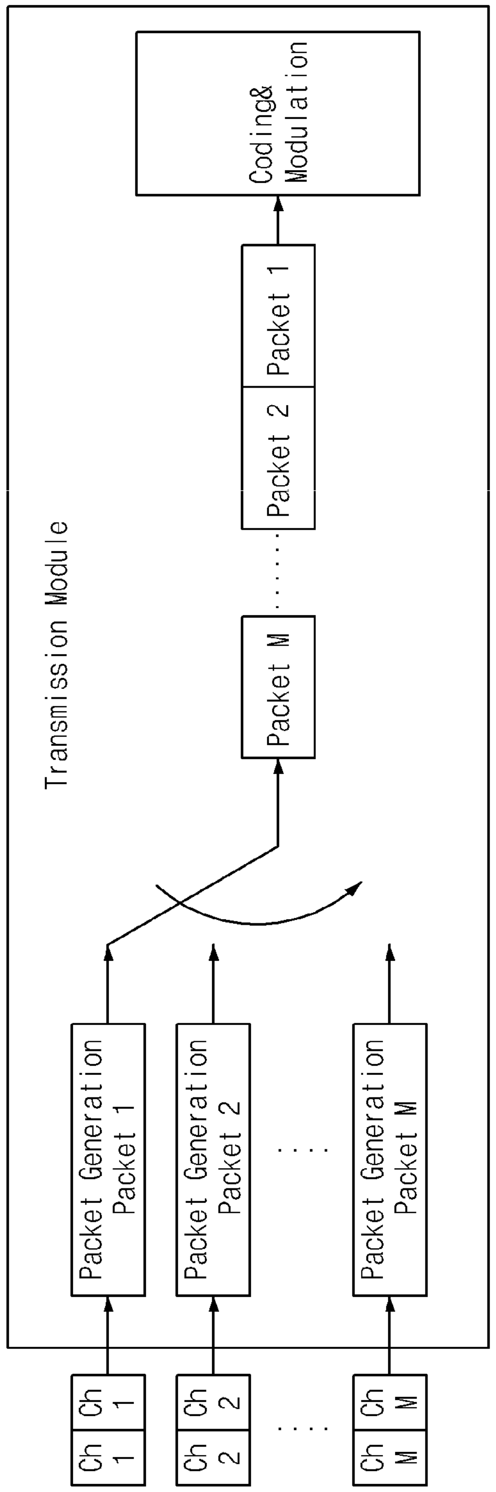
FIG. 1 is a diagram illustrating a conventional TDMA based multichannel wireless transmission system.
Figure 2:
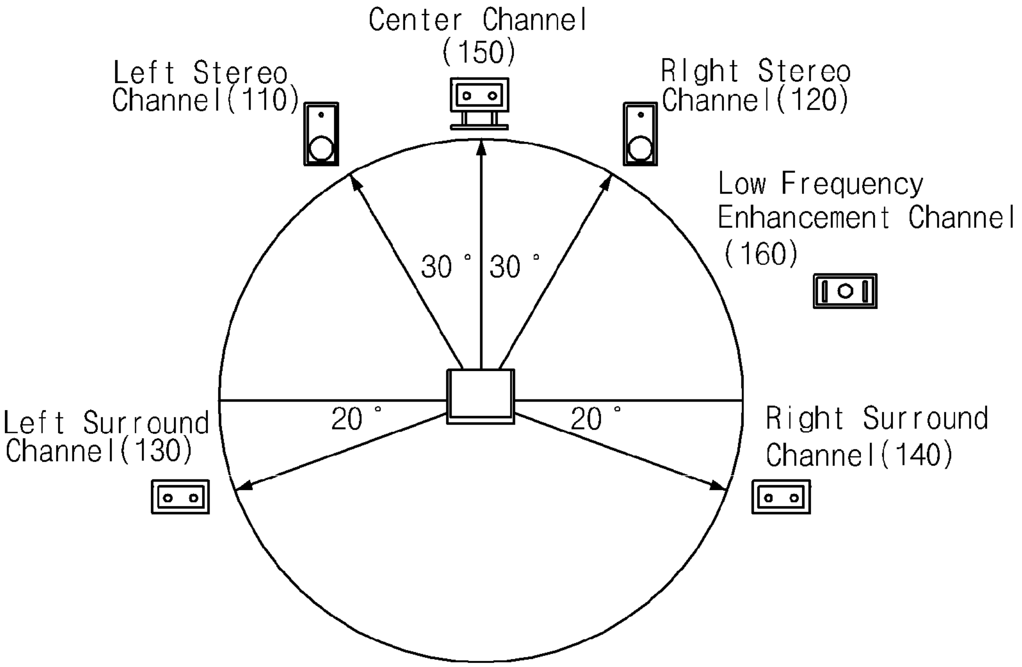
FIG. 2 is a diagram illustrating the layout of 5.1-channel sound system.

FIG. 2 illustrates a speaker layout of a conventional 5.1-channel sound system.

In this example, the 5.1-channel sound system is comprised of a left stereo channel 110, a right stereo channel 120, a left surround channel 130, a right surround channel 140, a center channel 150, and a low frequency enhancement channel (LFE) 160.

Figure 3:
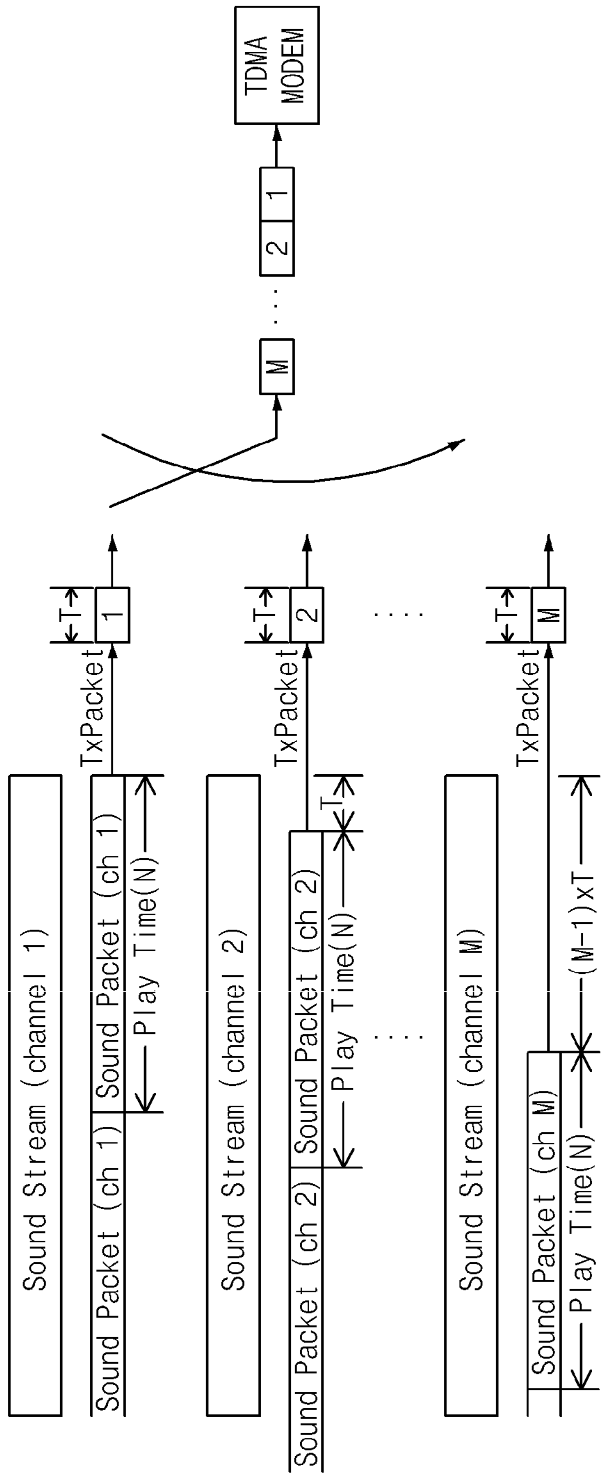
FIG. 3 is a diagram illustrating the structure of the transmitter unit of a TDMA based multichannel wireless transmission system in accordance with an exemplary embodiment of the present invention.

FIG. 3 illustrates a transmission structure of a WSDT in accordance with an example of the present invention. Hereinafter, a transmission structure of a WSDT in accordance with an exemplary embodiment of the present invention will be described with reference to FIG. 3.

As shown in FIG. 3, M number of multichannel sound acquired from the sound source are packetized with an appropriate time frame (N) for play by the WSSs. The resulting packets are modulated for wireless transmission, and a transmit packet (hereinafter referred to as "Tx packet") is obtained thereafter.

Time duration for transmission of a Tx packet is T. In a multichannel wireless speaker system having M number of sound channels, the time duration for complete wireless data transmission of all the sound channels (M×T) must be less than the sound data play time (N) for a real-time transmission of the sound data. Therefore it is assumed that any wireless transmission modem that is being used in the present invention satisfies such condition.

As shown in FIG. 3, in a TDMA based WSDT, data streams are transmitted in ascending order such as data stream of the sound channel 1, data stream of the sound channel 2, and the like. Once the data stream of the sound channel M is finally transmitted in accordance with the above-described manner, the WSDT begins to transmit the data stream of the sound channel 1.

According to FIG. 3, a WSDT divides data streams of the sound channels 1 to M into data packets having an allowable size for transmission. The WSDT transmits first data packet divided from data stream of the sound channel 1. The WSDT generates first data packet divided from data stream of the sound channel 2 through the process described as follows.

The WSDT discards part of data stream of the sound channel 2 corresponding to time T that is required for transmission of the first data packet of the sound channel 1, and generates first data packet of the sound channel 2 using the remaining part of data stream of the sound channel 2. The length of the data packet for the sound channel 2 transmitted via the wireless channel is that of data packet for the sound channel 1 transmitted via the wireless channel. In other words, if the play time required for the data packet of the sound channel 1 is N, the play time required for the data packet of the sound channel 2 is N as well.

As shown in FIG. 3, the WSDT generates a Tx packet transmittable for a duration T through the modulation of the data packet having play time N. The WSDT generates a first data packet divided from data stream of the sound channel M through the process described as follows. The WSDT discards part of data stream of the sound channel M corresponding to time T(M−1) that is required for transmission of the first data packet of the sound channel 1 to the first data packet of the sound channel (M−1), and generates first data packet using the remaining part of data stream of the sound channel M.

The length of the data packet for the sound channel M transmitted via the wireless channel is identical to that of data packet for the sound channel 1 transmitted via the wireless channel. In other words, if the play time required for the data packet of the sound channel 1 is N, the play time required for the data packet of the sound channel M is N as well.

Figure 4:
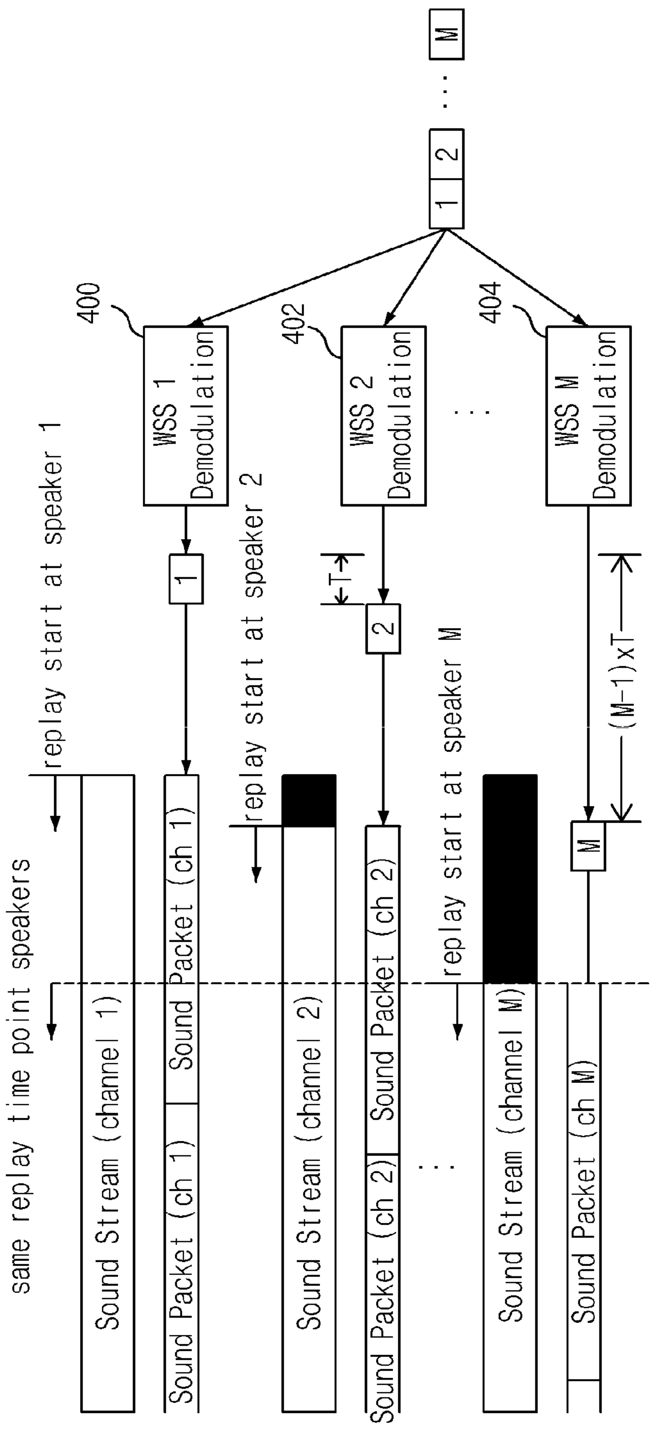
FIG. 4 is a diagram illustrating the structure of the receiver unit of a TDMA based multichannel wireless transmission system in accordance with an exemplary embodiment of the present invention.

FIG. 4 illustrates a packet receiving process by the WSSs in accordance with an example of the present invention. Hereinafter, a packet receiving process by the WSSs in accordance with an example of the present invention will be described with reference to FIG. 4.

As shown in FIG. 4, when all the sound channel data is transmitted via the wireless channel and is extracted at each WSS through demodulation of the received packets (hereinafter referred to as "Rx packet") corresponding to their own time slots. When all the Rx packets are received, the received data is played instantly.

The first WSS receives Tx packets that are divided from the first data stream while the second WSS receives Tx packets that are divided from the second data stream. The M-th WSS receives Tx packets that are divided from the M-th data stream.

The first WSS demodulates Tx packets into data packets through the demodulation unit 400 when the first Tx packet is completely received. The first WSS immediately starts to play after demodulation of the received Tx packet. The data of the second sound channel is received by the second WSS with a time delay T while the sound data of the first sound channel is being played.

The second WSS demodulates Tx packets into data packets through the demodulation unit 402 when the first Tx packet is completely received. The second WSS immediately starts to play after demodulation of the received Tx packet. The sound data played by the second WSS has a time delay T with respect to the sound data played by the first WSS. But because the sound data has been transmitted with a time delay T from the WSDT, sounds played by the two WSSs have identical play time point.

In a similar manner as described above, the data of the M-th sound channel is received by the M-th WSS with a time delay (M−1)T while the sound data of the first sound channel is being played. The M-th WSS demodulates Tx packets into data packets through the demodulation unit 404 when the first Tx packet is completely received. The M-th WSS immediately starts to play after demodulation of the received Tx packet. The sound data played by the M-th WSS has a time delay (M−1)T with respect to the sound data played by the first WSS. But because the sound data has been transmitted with a time delay (M−1)T from the WSDT, sounds played by the two WSSs have identical play time point.

In other words, although at first WSSs start to play sounds according to the preset operation sequence assigned to each WSS, when sound data play of all M number of sound channels begins to start, sounds having identical play time point are simultaneously being played in realtime from all the speakers.

Figure 5:
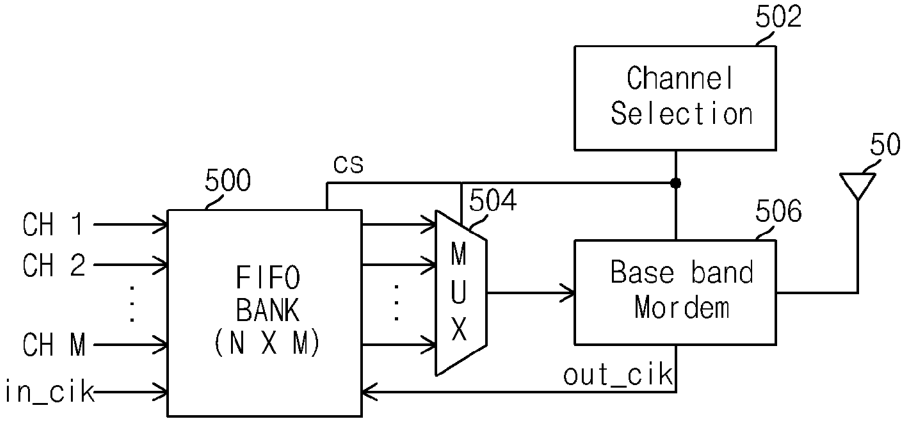
FIG. 5 is a diagram illustrating the FIFO bank structure of the transmitter unit of a TDMA based multichannel wireless transmission system in accordance with an exemplary embodiment of the present invention.

FIG. 5 illustrates the structure of a WSDT in accordance with an example of the present invention. Hereinafter, a WSDT in accordance with an exemplary embodiment of the present invention will be described with reference to FIG. 5.

A WSDT shown in FIG. 5 is comprised of a first-in first-out (hereinafter referred to as "FIFO") bank 500, a multiplexer unit (hereinafter referred to as "MUX") 504, a sound channel selection unit 502, a modem (i.e. modulation unit) 506, and an antenna 508. A WSDT may further comprise other elements including the abovedescribed elements.

The FIFO bank 500 has a length of N and receives data streams that are to be transmitted to the sound channels 1 to M. The FIFO bank 500 also receives input clock (in clk), output clock (out clk), and sound channel selection signal (CS). The FIFO bank 500 outputs one data stream selected among the data streams of the sound channels 1 to M that are inputted according to the received sound channel selection signal. The FIFO bank 500 divides received data streams into data packets having the same unit size before sending out the received data streams.

The MUX 504 sends a data stream selected among the data streams of the sound channels 1 to M that are received from the FIFO bank 500 to the modem 506. The modem 506 generates Tx packets by modulating the data packets received from the MUX, and transmits Tx packets outside via the antenna 508. The sound channel selection unit 502 generates a command signal (i.e. CS) directing sequential selection among the data streams that are to be transmitted to the sound channels 1 to M, for every preset time interval (T) one at a time.

Figure 6:
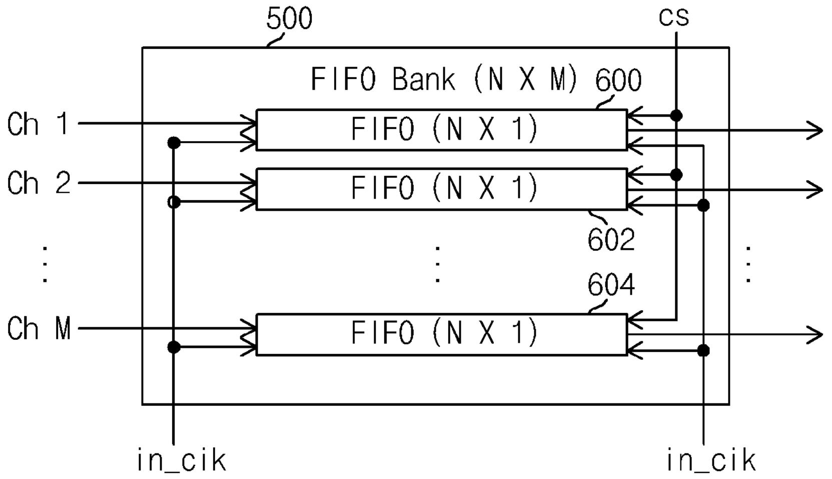
FIG. 6 is a diagram illustrating the FIFO bank structure of the transmitter unit of a TDMA based multichannel wireless transmission system in accordance with an exemplary embodiment of the present invention.

FIG. 6 illustrates an example of the FIFO bank 500 in accordance with an example of the present invention. Hereinafter, the structure and the operation of the FIFO bank 500 will be described with reference to FIG. 6. As shown in FIG. 6, the FIFO bank 500 is comprised of M number of FIFOs 600 to 604.

When power is applied to the WSDT, sound data is inputted to the FIFO bank 500 using the same input clock. The input clock for the sound data must be equally set as the sampling clock for the sound data. As described above, the FIFO bank 500 is comprised of M number of FIFOs.

Storage space of each FIFO is equal to the length of the sound data that is outputted during the duration of one output clock. Because data is simultaneously inputted to each FIFO using the same input clock, the time to store input data of length N is equal for all data inputs. When a data of length N is inputted to a FIFO, sound data is transmitted according to the process sequence described hereinafter. Inputting to the FIFO is continued even when the next operation sequence is being performed. If the FIFO already had stored N number of data, then the earliest input data in the FIFO is discarded first whenever a consecutive data is inputted so that the FIFO always maintains data no more than an amount N.

1. The sound channel selection unit selects a data FIFO to which data is transmitted during the first time slot.

2. The selected FIFO outputs N number of data according to the output clock generated by the modem. Because in general input clock frequency for a sound data is much lower than the operating speed of the modem, the output clock frequency is much higher than that of the input clock frequency. At this step, if the number of stored data in the selected FIFO is less than N, the FIFO waits until the number of stored data reaches N before outputting the stored data.

3. N number of data outputs are transmitted to the WSSs through the modem via wireless channels.

4. The WSS allocated with a time slot at present plays sound without delay after extraction of the sound from the received wireless signal.

5. After N number of sound data of the FIFO selected at present are transmitted, a sound data FIFO to be used during the next time slot is selected and the abovedescribed process is repeated from the step 2.

For example, if the output signal of the sound channel selection unit is for the sound channel 1, the FIFO bank outputs corresponding sound data assigned to the sound channel 1 that is stored in the FIFO 600 in accordance with the output clock. The sound data stored in the FIFO 600 corresponding to the sound channel 1 is transmitted through a modulation process via the antenna. During the time that the stored data in the FIFO 600 corresponding to the sound channel 1 is being transmitted, the FIFO bank 500 receives sound data according to the input clock. At this time, because a bank of the FIFO 600 corresponding to the sound channel 1 is empty, the received sound data is sequentially stored. But there is no available storage in the FIFO 602 to FIFO 604 corresponding to the sound channels 2 to M respectively. Therefore, the sound data in the FIFOs 602, 604 corresponding to the sound channel 2 and the sound channel M are discarded in descending order of stored time, and the amount of the data to be discarded is equal to the size of the newly inputted sound data.

After sending the sound data corresponding to the sound channel 1, the sound channel selection unit generates (outputs) a signal for selection of the sound channel 2. The FIFO bank outputs corresponding sound data assigned to the sound channel 2 that is stored in the FIFO 602 in accordance with the output clock. The sound data stored in the FIFO 602 corresponding to the sound channel 2 is transmitted through a modulation process via the antenna. During the time that the stored data in the FIFO 602 corresponding to the sound channel 2 is transmitted, the FIFO bank 500 receives sound data according to the input clock. At this time, because a bank of the FIFO 600 corresponding to the sound channel 1 and the FIFO 602 corresponding to the sound channel 2 are not full, the received sound data is sequentially stored. But there is no available storage in the FIFO 604 corresponding to the sound channels 3 to M. Therefore, the sound data in the FIFOs corresponding to sound channels 3 to M are discarded in descending order of stored time, and the amount of the data to be discarded is equal to the size of the newly inputted sound data. By repeating above-described process, the FIFO bank sends out sound data sequentially by using data inputs from the sound channels 1 to M. Thereafter, starting from the second data packets of each sound channel, all the input data packets are transmitted to the MUX without discarding any data in the FIFO bank as described above.

Although at first WSSs start to play sounds according to the preset operation sequence assigned to each WSS, when sound play starts from all the speakers, sounds are played at the identical play time point due to the synchronization between the speakers. Because each WSS immediately plays sounds by extracting sounds from the received data during its own time slot, additional structure or devices are not necessary for handling information such as present time and play time point for synchronization of the WSSs therefore the structure of the WSS can be significantly simplified by eliminating sound data buffer required for synchronization.

Figure 7:
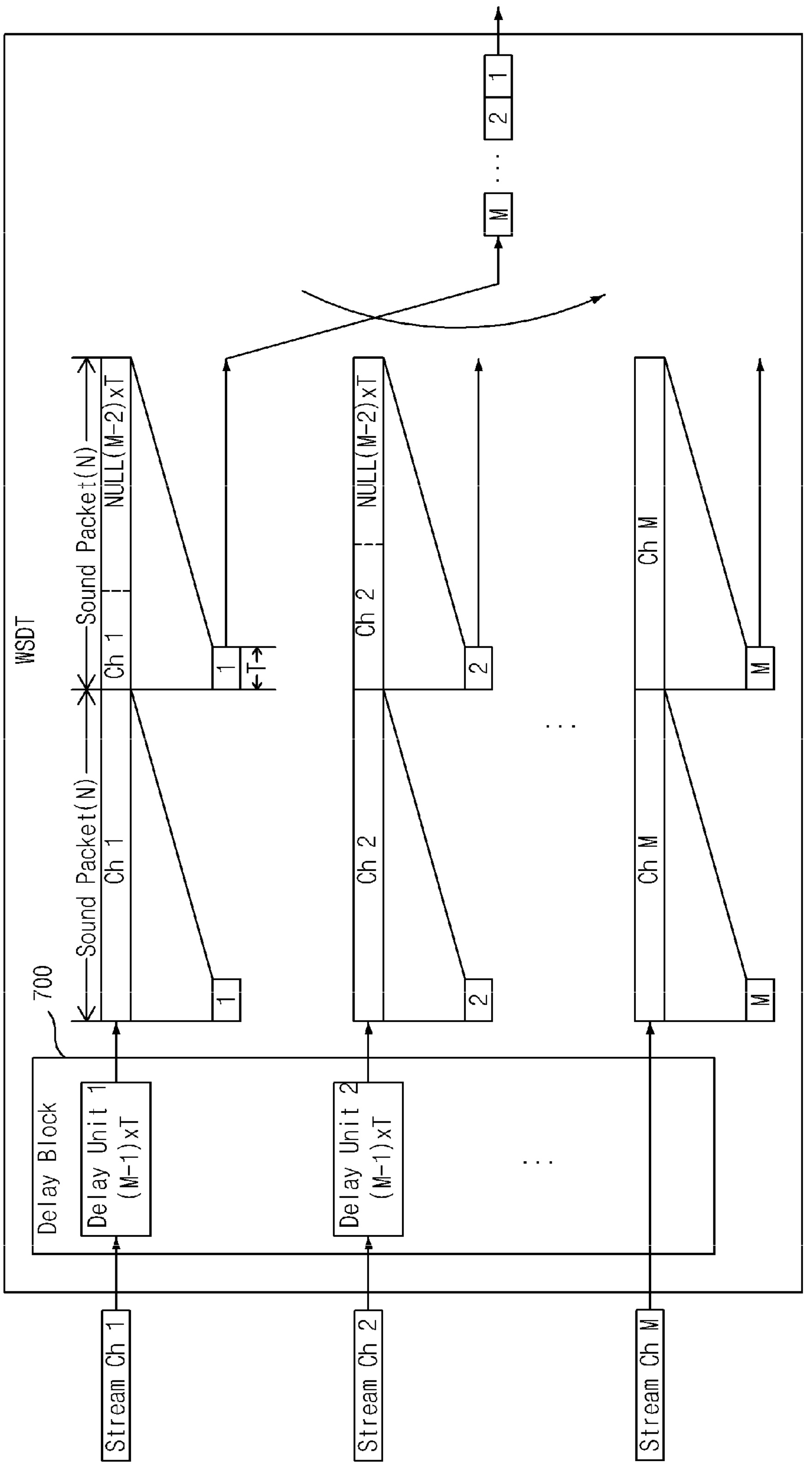
FIG. 7 is a diagram illustrating a transmission structure of a TDMA based multichannel wireless transmission system in accordance with an exemplary embodiment of the present invention.

FIG. 7 illustrates a transmission structure of a WSDT in accordance with an example of the present invention. Hereinafter, a transmission structure of a WSDT in accordance with an example of the present invention will be described with reference to FIG. 7.

As shown in FIG. 7, M number of multichannel sound acquired from the sound source are packetized into a time frame (N) for play by the WSSs. The resulting packets are modulated for wireless transmission, and a Tx packet is obtained thereafter. Time required for transmission of a Tx packet is T. In a multichannel wireless speaker systems having M number of sound channels, because the time required for complete wireless data transmission of all the sound channels (M×T) must be less than the sound data play time (N) for a real-time transmission of the sound data, it should be assumed that any wireless transmission modem that is being used in the present invention satisfies such condition.

According to FIG. 7, data streams of the sound channel 1 to M are transmitted to a delay block 700. In a TDMA based WSDT, data streams are transmitted sequentially starting from the data stream of the sound channel 1 followed by the data stream of the sound channel 2, and so on. Once the data stream of the sound channel M is finally transmitted in accordance with the above-described manner, the WSDT begins to transmit the data stream of the sound channel 1.

When the data streams of the sound channels 1 to M are simultaneously inputted, the delay block 700 transmits the data stream of the sound channel 1 with a preset time delay according to the control signal of the controller (not shown here). As described above, the delay time of the data stream in the delay block 700 is related to the number of data streams and required time for transmitting one packet among the packets that are formed by dividing the data stream into multiple packets of a predetermined size.

Delay lengths for data streams of assigned sound channels in the delay block are different from each other. Delay unit 1 of the delay block outputs data stream of the sound channel 1 with a time delay of (M−1)×T. Delay unit 2 of the delay block outputs data stream of the sound channel 2 with a time delay of (M−2)×T. The last data stream of the sound channel M is directly outputted without any delay.

The delay block may be implemented by using a buffer circuit (hereinafter referred to as "buffer"). The size of the buffer can be adjusted to be matched with the length of delay. Whenever data streams are inputted to the buffer, delayed data packets are outputted. If the length of the input data stream is shorter than the length of delay, delayed data packets are outputted after inserting null data.

In FIG. 7, data streams of sound channels 1 to M outputted from the delay block are illustrated. The WSDT divides data streams of sound channels 1 to M outputted from the delay block into data packets having an allowable size for transmission. The WSDT divides a data stream into packets of size N as shown in FIG. 7. The size of the packets formed by dividing the data streams in the WSDT may vary depending on the user capacity of the system or WSS specifications.

The WSDT transmits the first data packet of the sound channel 1 within time T followed by transmission of the first data packet of the sound channel 2 within time T. By repeating above-described process, the WSDT finally transmits the first data packet of the sound channel M. Subsequently, the WSDT starts to transmit the second data packet of the sound channel 1. As shown in FIG. 7, although at times of initial transmission null data are included in all sound channels except the sound channel M, but only sound data are transmitted starting from the second transmission.

As shown in FIG. 7, WSDT generates Tx packets that can be transmitted within time T through modulation of data packets having play time N. In other words, data packets are transformed into the Tx packets through modulation process in the modulation unit which is not shown in FIG. 7.

Figure 8:
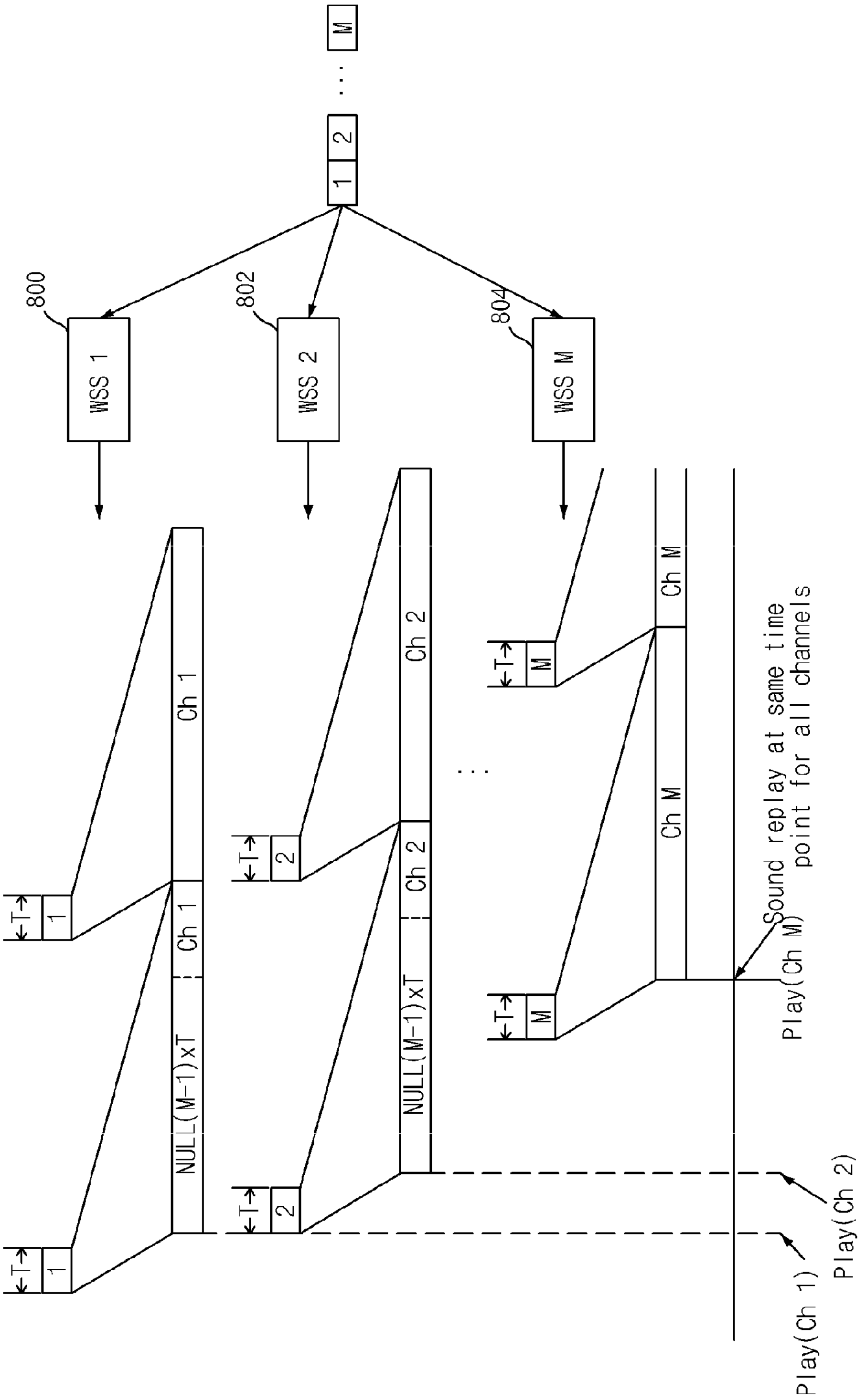
FIG. 8 is a diagram illustrating the structure of the receiver unit of a TDMA based multichannel wireless transmission system in accordance with an exemplary embodiment of the present invention.

FIG. 8 illustrates a packet receiving process by the WSSs in accordance with an example of the present invention. Hereinafter, a packet receiving process by the WSSs in accordance with an exemplary embodiment of the present invention will be described with reference to FIG. 8.

As shown in FIG. 8, when all the sound channel data is transmitted via the wireless channel, transmission data packets are generated at each WSS through demodulation of the received Tx packets corresponding to their own time slots. When all the Tx packets are received, sound data are played using the data packets generated through the demodulation process.

The first WSS 800 receives Tx packets divided from the first sound data stream while the second WSS 802 receives Tx packets divided from the second sound data stream. The M-th WSS 804 receives Tx packets divided from the M-th sound data stream.

The first WSS 800 immediately starts to play after demodulation of the received Tx packet when the first Tx packet is completely received. At the very first moment, actual sound is not outputted from the speaker even though immediate play process has been started because the front part of the first packet contains null data. In other words, because the WSS 800 starts to play after the time T required to receive packets and the time (M−1)×T delayed by the WSDT, therefore the actual sound play starts after the total time delay of M×T.

The second WSS 802 immediately starts to play after demodulation of the received Tx packet when the first Tx packet is completely received. At the very first moment, actual sound is not outputted from the speaker even though immediate play process has been started because the front part of the first packet contains null data. As described above the WSDT transmits the first Tx packet of the sound channel 1 from time 0 to time T, and transmits the first Tx packet of the sound channel 2 from time T to time 2T. In other words, because the WSS 802 starts to play after the time 2T required to receive packets and the time (M−2)×T delayed by the WSDT, the actual sound play starts after the total time delay of M×T.

The M-th WSS 804 immediately starts to play after demodulation of the received Tx packet when the first Tx packet is completely received. From the very first moment, actual sound is outputted from the speaker as immediate play process is started because the front part of the first packet does not contain null data unlike other sound channels. In other words, because the WSS 804 does not have other delay time except time M×T required to receive Tx packets, actual sound is outputted from the speaker after a time delay of M×T. Hence, all the WSSs start actual play after the same time delay of M×T, and therefore no additional operation is required for synchronization between the WSSs. It is assumed that all the WSSs have identical hardware configuration.

Each WSS immediately plays by extracting sounds from the received data corresponding to its own time slot, therefore additional structure or devices are not necessary for handling information such as present time and a play time point for synchronization of the WSSs. In other words, a multichannel sound system of the present invention enables an efficient sound data transmission, and has an advantage that it does not require a buffer to store received sound data for synchronization.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A data transmission device in a time-division multiple access (TDMA) based multichannel transmission system, the device comprising:

a bank comprising a plurality of memories which receive and store data in accordance with an input clock signal, and output a plurality of data packets comprising the data sequentially in accordance with an output clock signal; and a communication unit which transmits the data packets after modulation via respective channels, wherein if a time duration required for transmitting one data packet through a channel among the respective channels is T, a play time of a data packet in an M-th memory among the memories is (M−1)T.

2. A time-division multiple access (TDMA) based multichannel transmission system comprising:

a transmitter which receives data in accordance with an input clock signal, stores the data into a plurality of memories, outputs a plurality of data packets comprising the data sequentially, and transmits the data packets after modulation via respective channels; and a plurality of receivers which receive and play the data packets, respectively, from the transmitter, wherein if a time duration required for transmitting one data packet through a channel among the respective channels is T, a play time of a data packet in an M-th memory among the memories is (M−1)T.

3. A data transmission method in a time-division multiple access (TDMA) based multichannel wireless transmission system, the method comprising:

conveying data to respective delay units;

outputting a plurality of data packets comprising the data from the delay units with respective time delays from previously output data packets as assigned to a plurality of channels for transmitting the data packets; and transmitting the data packets according to an order of a predetermined sequence via the channels, wherein if a number of the channels is M and a time duration required for transmitting a data packet through a channel among the channels is T, a length of data packet delay at a delay unit among the delay units corresponding to a k-th channel among the channels is (M−k)T.

4. The method of claim 3, wherein the data packet delay is performed only at a time point prior to the transmission of a firstly transmitted data packet in a corresponding channel among the wireless channels.

5. A data transmission method in a time-division multiple access (TDMA) based multichannel transmission system, the method comprising:

conveying data to respective delay units;

outputting a plurality of data packets comprising the data from the delay units with respective time delays from previously output data packets as assigned to a plurality of wireless channels for transmitting the data packets; and transmitting the data packets according to an order of a predetermined sequence via the wireless channels, wherein a time duration required for transmitting the data packets is less than or equal to a play time duration of all the data packets.

6. A data transmission device in a time-division multiple access (TDMA) based multichannel transmission system, the device comprising:

a delay unit which outputs a data packet input to the delay unit with a predetermined time delay as assigned to a channel for transmitting the data packet; and a communication unit which transmits the data packet delayed by the delay unit after modulation via the channel according to a predetermined transmission order, wherein if a number of channels including the channel is M and a time duration required for transmitting the data packet through the channel is T, a length of data packet delay at the delay unit corresponding to a k-th channel among the channels is (M−k)T.

7. A time-division multiple access (TDMA) based multichannel transmission system comprising:

a transmitter which receives data, outputs each of a plurality of data packets comprising the data with a predetermined time delay as assigned to each of a plurality of channels, and transmits the packets to respective receivers after modulation via the channels, wherein at least one of the receivers for playing a data packet among the data packets received from the transmitter, wherein the transmitter comprises:

a plurality of delay units which output the data packets input to the delay units with respective time delays as assigned to the channels, respectively;

a modem which modulates the data packets output from the delay units; and a communication unit which transmits the data packets via the channels, respectively, and wherein if a number of the channels is M and a time duration required for transmitting a data packet among the data packets through a channel among the channels is T, a length of data packet delay at a delay unit among the delay units corresponding to a k-th channel among the channels is (M−k)T.

* * * * *